United States Patent
Stephens et al.

(10) Patent No.: US 10,303,669 B1
(45) Date of Patent: May 28, 2019

(54) SIMULATING HIERARCHICAL STRUCTURES IN KEY VALUE STORES

(71) Applicant: Amazon Technologies, Inc., Seattle, WA (US)

(72) Inventors: Christopher Andrew Stephens, Issaquah, WA (US); Alazel Acheson, Redmond, WA (US); Douglas Stewart Laurence, Mercer Island, WA (US); Seth William Markle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 15/085,824

(22) Filed: Mar. 30, 2016

(51) Int. Cl.
G06F 17/30 (2006.01)
G06F 7/00 (2006.01)
G06F 16/22 (2019.01)
G06F 16/13 (2019.01)

(52) U.S. Cl.
CPC .............. *G06F 16/22* (2019.01); *G06F 16/13* (2019.01); *G06F 16/2219* (2019.01)

(58) Field of Classification Search
CPC ......... G06F 17/30312; G06F 17/30091; G06F 17/30318
USPC .......................................................... 707/756
See application file for complete search history.

(56) References Cited

U.S. PATENT DOCUMENTS

| | | | |
|---|---|---|---|
| 7,136,867 B1 * | 11/2006 | Chatterjee | G06F 16/9027 713/171 |
| 8,849,777 B1 | 9/2014 | Xing | |
| 8,892,818 B1 | 11/2014 | Zheng et al. | |
| 8,996,482 B1 * | 3/2015 | Singh | G06F 16/27 707/698 |
| 9,542,391 B1 * | 1/2017 | Eisner | G06F 16/1767 |
| 9,648,007 B1 * | 5/2017 | Sterling | H04L 63/0807 |
| 9,852,146 B1 * | 12/2017 | Bent | G06F 16/1774 |
| 10,095,701 B1 * | 10/2018 | Faibish | G06F 16/166 |
| 2003/0115322 A1 | 6/2003 | Moriconi et al. | |
| 2011/0072126 A1 * | 3/2011 | Wujuan | G06F 16/1827 709/224 |
| 2011/0313973 A1 | 12/2011 | Srivas et al. | |
| 2012/0109935 A1 * | 5/2012 | Meijer | G06F 16/258 707/713 |

(Continued)

*Primary Examiner* — Pavan Mamillapalli
(74) *Attorney, Agent, or Firm* — Davis Wright Tremaine LLP

(57) ABSTRACT

A key-value store is adapted to represent hierarchical structures, such as directory structures, to be associated with objects otherwise mapped to a flat keyspace. For example, one or more key-value pairs stored in the key-value store are designated to have a key indicating the name of a hierarchical structure, and an associated value that maps the structure to a namespace (e.g., of a group of objects to be associated with a directory). Inbound requests for operations related to the objects in a given namespace and defining the structure are checked against such "redirecting" key-value pairs to determine whether the structure is related to the namespace objects, and if so, the request is internally processed to perform the requested operations against the actual key-value pair(s) associated with the objects without necessitating identification of the objects with a fully qualified name as represented in the flat keyspace.

20 Claims, 8 Drawing Sheets

(56) References Cited

U.S. PATENT DOCUMENTS

| | | | |
|---|---|---|---|
| 2012/0284317 A1* | 11/2012 | Dalton | G06F 16/13 |
| | | | 707/827 |
| 2012/0310882 A1* | 12/2012 | Werner | H04L 67/1095 |
| | | | 707/624 |
| 2013/0103729 A1 | 4/2013 | Cooney et al. | |
| 2013/0145349 A1* | 6/2013 | Basak | G06F 9/44505 |
| | | | 717/121 |
| 2014/0081918 A1 | 3/2014 | Srivas et al. | |
| 2014/0156618 A1* | 6/2014 | Castellano | G06F 16/2358 |
| | | | 707/703 |
| 2014/0181223 A1 | 6/2014 | Homsany et al. | |
| 2015/0242454 A1* | 8/2015 | Bakre | G06F 16/2291 |
| | | | 707/652 |
| 2016/0063008 A1 | 3/2016 | Benight | |
| 2016/0371368 A1 | 12/2016 | Brown et al. | |
| 2017/0139610 A1* | 5/2017 | Choi | G06F 12/0873 |
| 2017/0262461 A1 | 9/2017 | Androulaki et al. | |

\* cited by examiner

SIMULATING HIERARCHICAL STRUCTURES IN KEY VALUE STORES

CROSS REFERENCE TO RELATED APPLICATIONS

This application incorporates by reference for all purposes the full disclosure of co-pending U.S. patent application Ser. No. 15/085,775, filed Mar. 30, 2016, entitled "POLICY-MEDIATED HIERARCHICAL STRUCTURES IN KEY VALUE STORES."

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

In some circumstances, the underlying implementation of certain network computing and data storage systems may differ from usage patterns or other behaviors associated with entities connecting with and utilizing such network computing and data storage systems. Adaptations of such systems may be efficiently implemented to meet customer and operational demands.

BRIEF DESCRIPTION OF THE DRAWINGS

Various techniques will be described with reference to the drawings, in which.

DETAILED DESCRIPTION

Figure 1:
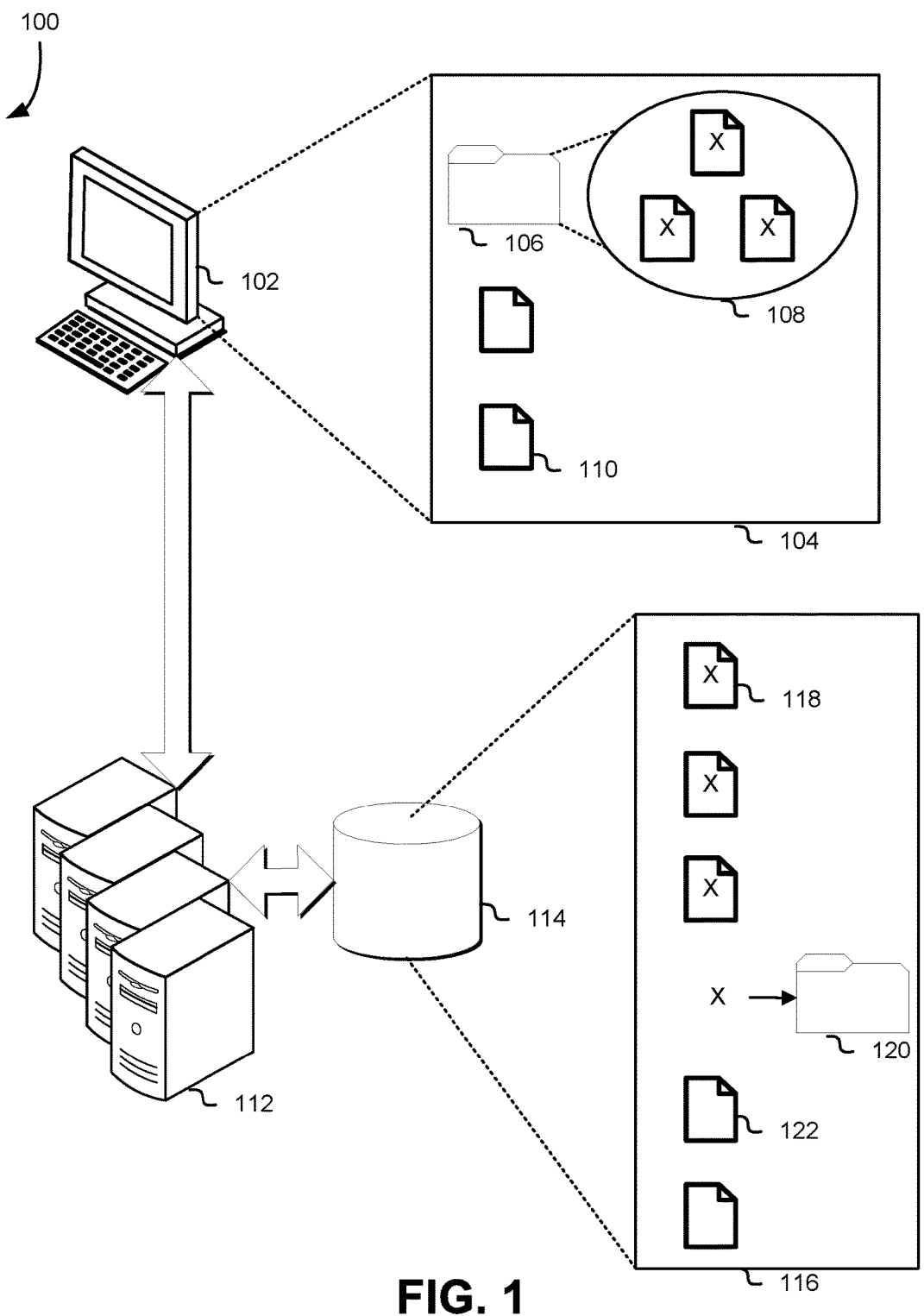
FIG. 1 illustrates an environment in which a flat keyspace represented in a key-value store is adapted so as to simulate multi-level hierarchies for connecting entities, in accordance with some embodiments.

In one example, a data storage paradigm, such as a key-value store or database, stores various key-value pairs in a flat hierarchy (i.e., where no particular pair inherits any other). Such key-value stores (or other similar paradigms) may be implemented as part of, and/or directly accessible to, entities, such as customer entities, wishing to store objects or other data in connection with the various key-value pairs in the key-value store. For example, the key-value store may be in communication with one or more data storage systems or data storage services, and may point to the location of specific objects within such data storage systems or services as part of one or more implemented facilities. As may be contemplated, a requesting customer entity may wish to organize the objects in a hierarchical, rather than flat fashion, and such objects may be so arranged as represented on a device with which the requesting customer entity connects and communicates with the key-value store and, in some cases, one or more data storage systems.

In such embodiments, a key-value store, and/or an associated keyspace, is adapted so as to simulate a multi-level hierarchy, such as a directory tree. For example, redirecting key-value pairs, which are configured to name the simulated structure (e.g., directory) in the key and identify at least one or more other key-value pairs (which may represent other simulated structures or actual stored objects) in the value, are included within the flat keyspace represented in the key-value store. Accordingly, while the actual keyspace of the key-value pairs stored with the key-value store remains flat, the use of redirection (or indirection) via the techniques described herein may allow for such objects to be represented in a multi-hierarchical structure, and thus obfuscate the actual operation principle of a key-value store implemented as such.

In some embodiments, objects in multiple data storage systems or other entities may be represented in the key-value store. In some of such embodiments, some or all of the multiple data storage systems are connected to the key-value store via, e.g., an application programming interface. As may be contemplated, in multitenant systems with multiple subsystems in interaction therewith, with a plurality of disparate users and requestors requesting services, data, etc. in parallel and at generally uncoordinated times, access control, as well as per-user differentiation of behavior with respect to a given object, redirection, or the like, may be desired.

In some embodiments, a policy management system (and/or associated service) may be connected with the key-value store so as to provide policy-mediated access control and behavior differentiation for simulated hierarchical structures. For example, the identity of a requestor associated with a storage, retrieval, deletion, list, or other request may, based on the policy associated with a given redirection, hierarchical structure, or object, alter the level of access the requestor has to the redirection, hierarchical structure, or object, and/or the behavior of such a redirection, hierarchical structure, or object in the case that the requestor is authorized to access the entity or paradigm via the policy.

The techniques described herein may be implemented as, or to augment and/or support, one or more services of a computing resource service provider. For example, the key-value store may be implemented so as to track associated objects or other data (whether structured or unstructured) across multiple systems, which may include customer entities (whether on- or off-premise relative to devices of the computing resource service provider), multiple services of the computing resource service provider, and the like.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which a flat keyspace represented in a key-value store is adapted so as to simulate multi-level hierarchies for connecting entities, in accordance with some embodiments.

A requestor, such as a customer via a customer device 102 and over, e.g., a network, interacts with a key-value store 114 via, e.g., an implementing computing resource service provider 112, having under control or stored on one or more entities associated therewith data objects 118, 122. The data objects 118, 122 are arranged within a flat keyspace 116, i.e., a keyspace with only one level of hierarchy.

The customer device 102 may be any computing resource or collection of such resources enabling the customer to interface with the data storage system, such as in a programmatic fashion (e.g., via web service call or application programming interface call), and transact data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The key-value store 114 may be any computing resource or collection of such resources capable of storing key-value pairs, or other similar constructs, and may be implemented in hardware, software, or some combination thereof (e.g., as databases and the like). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network may be a communication network, such as the Internet, an intranet or an Internet service provider (ISP) network. Some communications from the customer device to the data storage system may cause the data storage system to operate in accordance with one or more embodiments described or a variation thereof. The front end through which the computing resource service provider 112, as well as other services and systems (such as the key-value store 114) as further described herein, operates, may be any entity capable of interfacing via the network with the customer device 102, as well as various other components of a computing resource service provider 112, so as to coordinate and/or direct data and requests to the appropriate entities. Examples of such components include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The objects 118, 122 may be produced by a program, process, application, module, service, or system associated with a computing resource service provider as described herein. The objects may also be produced by a user or customer of the computing resource service provider, and submitted to the computing resource service provider 112 via a customer device 102 and transmitted via a network. The set of data may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

As mentioned, the objects 118, 122 may be arranged, or referred to, in/by a key-value store 114 having a flat keyspace, and as illustrated, may each have an associated key-value pair in the key-value store. The keyspace 116 may be flat in hierarchy, i.e., no one object or key-value pair implicitly inherits another, and in some cases each key of the key-value pair is unique and/or idempotent. The keys and values of the key-value pairs may have different purposes, depending on the implementation. For example, in some embodiments, some or all of the keys may include the name of the object, which may include an identifier that may be arbitrary, link the object to other groups of other objects (such as those in the same namespace, which in turn may be assigned based on the specific system or subsystem (or division thereof) to which it is associated), and the like. The values may include the data of the object itself, an external location (such as an offset, address, inode, IP address, or other identifier) at which the object may be located (e.g., on a disparate data storage system(s)), one or more policies associated with the object, and the like.

In some embodiments, the key-value store 114, and/or an associated keyspace 116, is adapted so as to simulate a multi-level hierarchy (e.g., hierarchical keyspace or data paradigm 104), such as a directory tree, as may be represented on an entity such as the requesting customer entity 102. For example, one or more redirecting key-value pairs 120, which are configured to name the simulated structure (e.g., directory) in the key and identify at least one or more other key-value pairs (which may represent other simulated structures or actual stored objects) in the value, are included within the flat keyspace 116 represented in the key-value store. Accordingly, while the actual keyspace of the key-value pairs stored with the key-value store remains flat, the use of redirection (or indirection) via the techniques described herein may allow for such objects to be represented in a multi-hierarchical structure, and thus obfuscate the actual operational principle of a key-value store implemented as such.

In the illustrated example, the objects 118, 122 stored in connection with key-value pairs in the flat keyspace are represented, such as via a network file system (NFS) or otherwise shown via an interface, such as a user interface, associated with the customer device 102, in a multi-level hierarchical format, such as part of a directory tree. As illustrated, the multi-level hierarchy 104 includes some objects at the root directory 110 and other objects 108 apparently stored in a subdirectory 106, while the actual objects as stored on the remote system remain associated with key-value pairs in the flat hierarchy 116.

This effect may be achieved via the implementation of one or more redirecting key-value pairs 120. The redirecting key-value pair may be functionally similar to any other key-value pair stored in the key-value store 114, except that the key and the value of the redirecting key-value pair may, rather than pointing to a location of an object, be associated with a plurality of objects. As an example, the key of the redirecting key-value pair may include information regarding the name of the hierarchical structure (e.g., directory) to be represented, while the associated value of the key-value pair may name various aspects of the association, such as identifying the name space of one or more of the objects associated with the directory, one or more policies associated with the namespace, the objects, or the redirection/indirection associated with the redirecting key-value pair, identification of a triggering delimiter, and/or the like.

In the illustrated example, a subset of the stored objects 118 (marked with an 'X') are associated with a directory 106 via a redirecting key-value pair 120, while other stored objects 122 are not associated therewith. As viewed by the customer device 102 and according to techniques described in further detail herein, the X-marked objects 108 appear to reside within the directory 106 as a result of the actions associated with the redirecting key-value pair, while the remaining objects 122 appear outside of the directory (e.g., 110).

In some embodiments, objects in multiple data storage systems or other entities may be represented in the keyspace of the key-value store 114. For example, the computing resource service provider 112 may provide a single point of contact for the customer device 102 to access and manipulate objects across multiple data storage entities associated with the computing resource service provider 112, and the key-value pairs associated with such objects may include information (such as in the value of such key-value pairs) of the specific systems in which the respective objects are located. In some of such embodiments, some or all of the multiple data storage systems are connected to the key-value store via, e.g., an application programming interface (API), web service call(s), and the like. As may be contemplated, in multitenant systems with multiple subsystems in interaction therewith, with a plurality of disparate users and requestors requesting services, data, etc. in parallel and at generally uncoordinated times, access control, as well as per-user differentiation of behavior with respect to a given object, redirection, or the like, may be desired.

Figure 2:
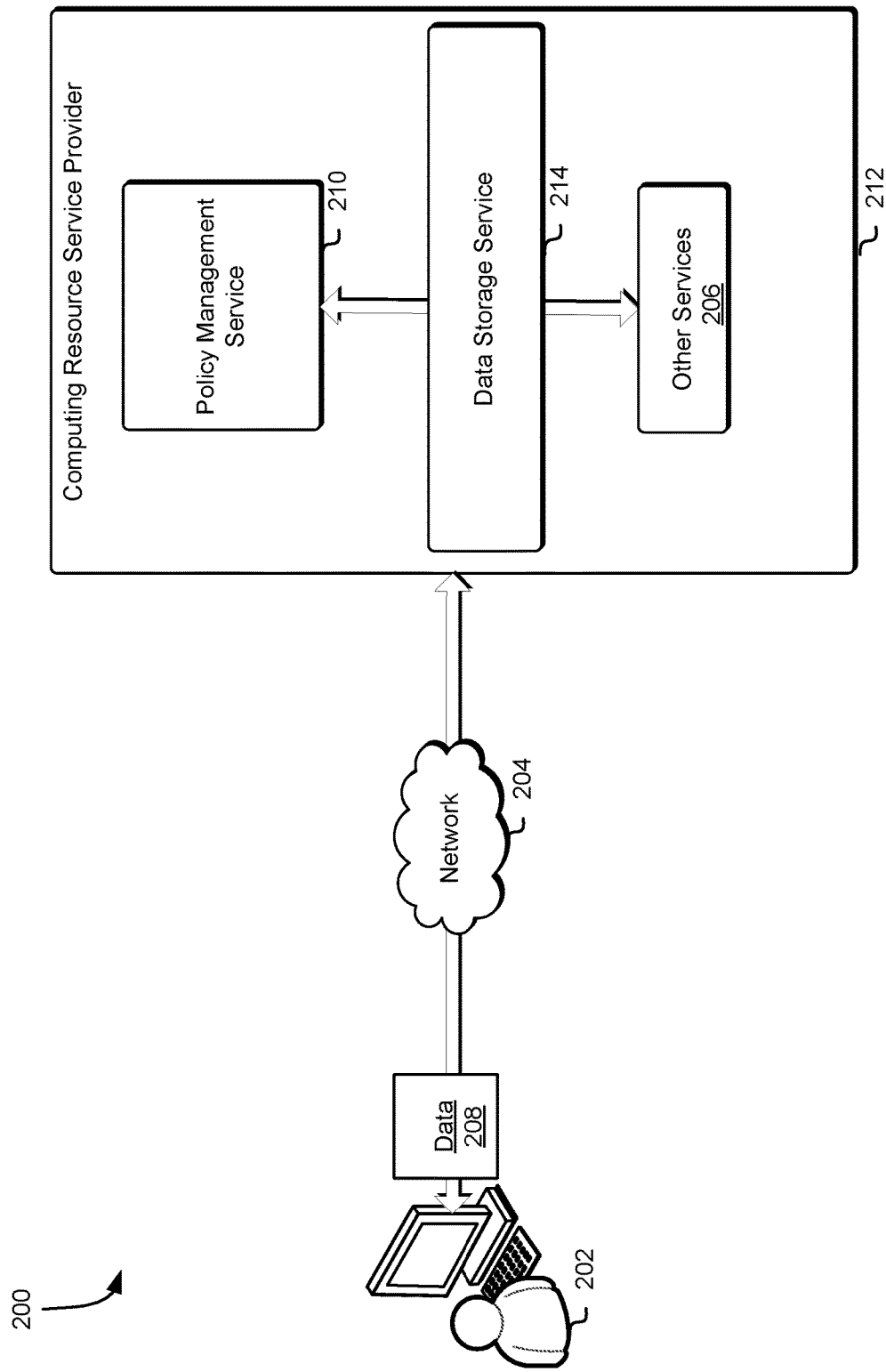
FIG. 2 illustrates an environment, including a computing resource service provider having a policy management service and a data storage service, in which various embodiments can be implemented.

FIG. 2 illustrates an environment, including a computing resource service provider having a policy management service and a data storage service, in which various embodiments can be implemented.

A customer, via a customer device 202, may connect via a network 204 to one or more services provided by a computing resource service provider 212. In some embodiments, the computing resource service provider 212 may provide a distributed, virtualized and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 202 and the network 204 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 202, or may originate as a result of an automatic process or may originate as a result of a combination of these and/or other such origin entities. In some embodiments, the command or commands to initiate the connection to the computing resource service provider 212 may be sent to the services 206, 214, 210, without the intervention of the user of the services 206, 214, 210. The command or commands to initiate the connection to the services 206, 214, 210 may originate from the same origin as the command or commands to connect to the computing resource service provider 212 or may originate from another computer system and/or server, or may originate from a different entity, user, or process on the same or a different remote network location, or may originate from a different entity, user, or process within the computing resource service provider, or may originate from a different user of the customer device 202, or may originate as a result of a combination of these and/or other such same and/or different entities.

The customer device 202 may request connection to the computing resource service provider 212 via one or more connections and, in some embodiments, via one or more networks 204 and/or entities associated therewith, such as servers connected to the network, either directly or indirectly. The customer device 202 that requests access to the services 206, 214, 210 may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 204, also as previously discussed, may include, for example, a local network, an internal network, a public network such as the Internet, or other networks such as those listed or described herein. The network may also operate in accordance with various protocols such as those listed or described herein.

The computing resource service provider 212 may provide access to one or more host machines as well as provide access to services such as virtual machine (VM) instances, automatic scaling groups, or file-based database storage systems as may be operating thereon. The services 206, 214, 210 may connect to or otherwise be associated with one or more storage services such as those described herein (e.g., the data storage service 214). The storage services may be configured to provide data storage for the services 206, 214, 210. In an embodiment, the computing resource service provider 212 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 212 may provide a variety of services 206, 214, 210 to the customer device 202, which may in turn communicate with the computing resource service provider 212 via an interface, which may be a web service interface, application programming interface (API), user interface, or any other type of interface. The services 206, 214, 210 provided by the computing resource service provider 212 may include, but may not be limited to, a virtual computer system service, a block-level data storage service, a cryptography service, an on-demand data storage service, a notification service, an authentication service, a policy management service 210, an archival storage service, a durable data storage service such as the data storage service 214, and/or other such services 206. Each of the services 206, 214, 210 provided by the computing resource service provider 212 may include one or more web service interfaces that enable the customer device 202 to submit appropriately configured API calls to the various services through web service requests so as to, e.g., transact data 208 therewith. In addition, each of the services may include one or more service interfaces that enable the services to access each other (e.g., to enable a virtual computer system of the virtual computer system service to store data in or retrieve data from the on-demand data storage service or the data storage service 214, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 212 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The customer 202, a service 206, 210, 214, or other entity of the computing resource service provider 212 may define one or more policies that may be applied to incoming requests from various users for access to a computing resource, e.g., of the computing resource service provider 212. A policy may be a collection of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

Policies may be maintained by a policy management service 210 and may be stored in a policy database, which may be a distributed database (similar to, e.g., a key-value store as previously described) in a distributed system with multiple nodes that access the policies. In an embodiment, a customer 202 with privileges for modifying permissions and/or for modifying a set of policies (e.g., an administrator or such other user with privileges for modifying a set of policies, also referred to herein as a "privileged user") of an organization may communicate with the policy management service using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Policies may be authored in a default state such as, for example, denying all access or granting all access. Policies may also be authored based on organizational business needs and/or may be based on roles within that organization so that, for example, all software developers have the same computing resource policy. Computing resource policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

A policy management service 210 may provide access to, and administration of, policies applicable to requests for access to computing resources (e.g., web service application programming interface requests). For example, the policy management service 210 may receive information sufficient for selecting policies applicable to pending requests. In some embodiments, the information may be copies of the requests, or may be information generated based at least in part on the requests. For example, a service such as a service frontend (described herein) may receive a request for access to resources and may generate a query to the policy management service 210 based at least in part on information specified by the request.

In an embodiment, a computing resource service 212, in response to a request from a user 202 to access one or more computing resources provided by the computing resource service 212, obtains a set of policies from the policy management service 214 that may be used to determine whether the user 202 is authorized to access the one or more computing resources. The computing resource service 212 may check whether the fulfillment of the request for access to the service 206, 214 would comply with the obtained policies using a policy evaluation component. A policy evaluation component may be a process executing on the service that is operable to compare the request to the one or more permissions in the policies to determine whether service may satisfy the request (i.e., whether fulfillment of the request is authorized). For example, the policy evaluation component may compare an API call associated with the request against permitted API calls specified by the policies to determine if the request is allowed. If the policy evaluation component is not able to match the request to a permission specified by the policies, the policy evaluation component may execute one or more default actions such as, for example, providing a message to the service that causes the service to deny the request, and causing the denied request to be logged in the policy management service. If the authorization matches the request to one or more permissions specified by the policies, the policy evaluation component may resolve this by selecting the least restrictive response (as defined by the policies) and by informing the service whether the fulfillment of the request is authorized (i.e., complies with applicable policies) based on that selected response. The policy evaluation component may also by select the most restrictive response or may select some other such response and inform the service whether the fulfillment of the request is authorized based on that selected response.

The policy evaluation component may check whether the fulfillment of the request for access to the service would comply with the one or more active policies obtained from the policy management service 210. If the request from the user 202 does not comply with the one or more active policies, the policy evaluation component may transmit a message to the computing resource service that causes the computing resource service to deny the user's request to access the computing resource service or otherwise access one or more computing resources maintained by the computing resource service. Alternatively, if the request from the user 202 does comply with the one or more active policies, the policy evaluation component may transmit a message to the computing resource service that may cause the computing resource service to fulfill the request.

Figure 3:
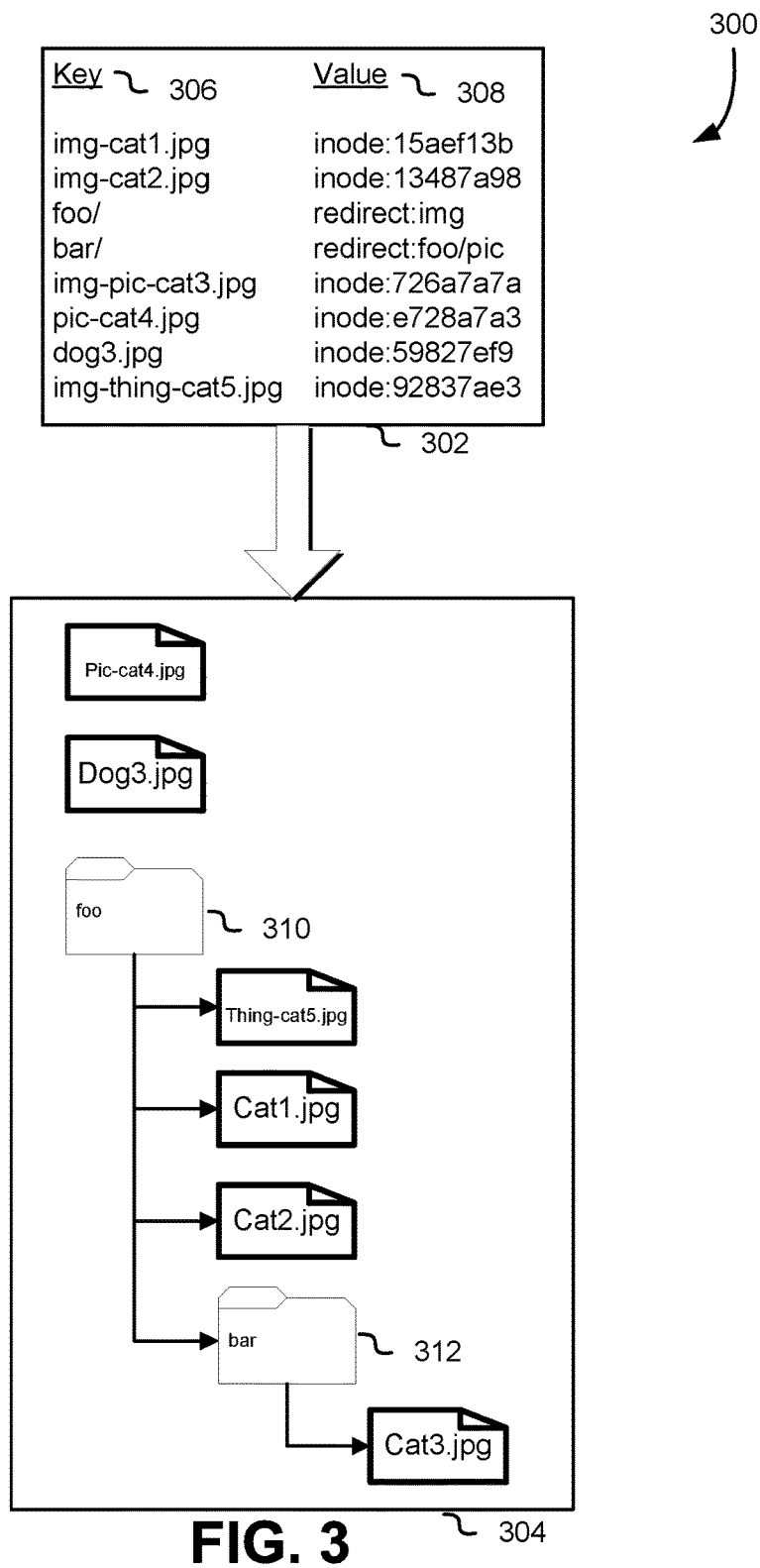
FIG. 3 illustrates an example representation of adaptation of a flat keyspace to simulate or otherwise implement a multi-level hierarchical structure, such as a directory tree, in accordance with some embodiments.

FIG. 3 illustrates an example representation of adaptation of a flat keyspace to simulate or otherwise implement a multi-level hierarchical structure, such as a directory tree, in accordance with some embodiments.

As mentioned in connection with at least FIG. 1 above, a set of key-value pairs, each having a key 306 and an associated value, are stored in a key-value store and have a flat hierarchy (e.g., flat keyspace 302). Also as previously mentioned, the values of the key-value pairs, except for the redirecting key-value pairs (e.g., those with key names "foo/" and "bar/"), point to specific locations of the objects in question. For example, the object named "img-cat1.jpg" has a location of "inode:15eef13b" as illustrated.

The illustrated example includes two redirecting key-value pairs—"foo/" and "bar/," with the "/" character set as the triggering delimiter. The delimiter may be any character or characters, and may be either predetermined (e.g., by the implementing system), defined by an external requester (either separately from or in connection with an object storage request). Upon receiving a request containing the defined delimiter, the implementing system may read the characters preceding the delimiter and perform a lookup in the key-value store to determine if a redirecting key-value pair with a key matching those characters exists. If so, the implementing system may append the mapped value of the redirecting key-value pair to the actual operation and proceed with the operation.

In the illustrated example, the key-value store includes several key-value pairs associated with objects, some of which have names (keys) that include prefixes. Such prefixes ("img-," "pic-") may be a part of the object name or may be added upon being mapped to a given namespace, e.g., by an external system. For example, objects of a certain type (images, for example), may be prefixed with "img-." Similarly, such prefixes may be arbitrary, such as if the user desires to move a plurality of objects into an arbitrarily defined directory, as part of that process, they may all be tagged with a prefix of that user's (or the implementing system's) choosing. In some embodiments, the prefix may correspond to a namespace defined by the user, the system, or some combination thereof. In some embodiments, the namespace implies a specific provenance or location of the object (e.g., objects residing on one data storage system have one namespace, objects residing on another system are associated with another namespace).

As illustrated, the "foo/" simulated directory redirects to objects with the prefix "img." Accordingly, within the userspace 304, the "foo/" simulated directory appears at 310, with all objects with the namespace (or other prefix) "img" as children (e.g., img-thing-cat5.jpg, img-pic-cat3.jpg, img-cat1.jpg, and img-cat2.jpg). The "bar/" redirecting key-value pair has a value of "foo/pic," indicating that it points to the simulated directory "foo/" and the namespace "pic." Accordingly, it is presented in userspace 304 as being a child of "foo," and including the object "img-pic-cat3.jpg." In the illustrated example, in the userspace 306, the prefixes are not shown as they are not part of the name in userspace (implying that they were tagged by the system or the user as a result of, e.g., their storage location, file type, etc.). However, note tat "pic-cat4.jpg" does not belong to a simulated directory, as there is no associated redirecting key. Similarly, dog3.jpg does not belong to a simulated directory.

These techniques provide for simple renaming of simulated directories (or other hierarchical structures) by changing the key, e.g., from "foo/" to "stuff/," without having to change values or keys associated with the objects associated with the structure. Similarly, directory listing, directory association and dissociation tasks are efficient as only the configuration of the redirecting key-value pair need be changed, rather than necessarily each object-associated key-value pair.

Figure 4:
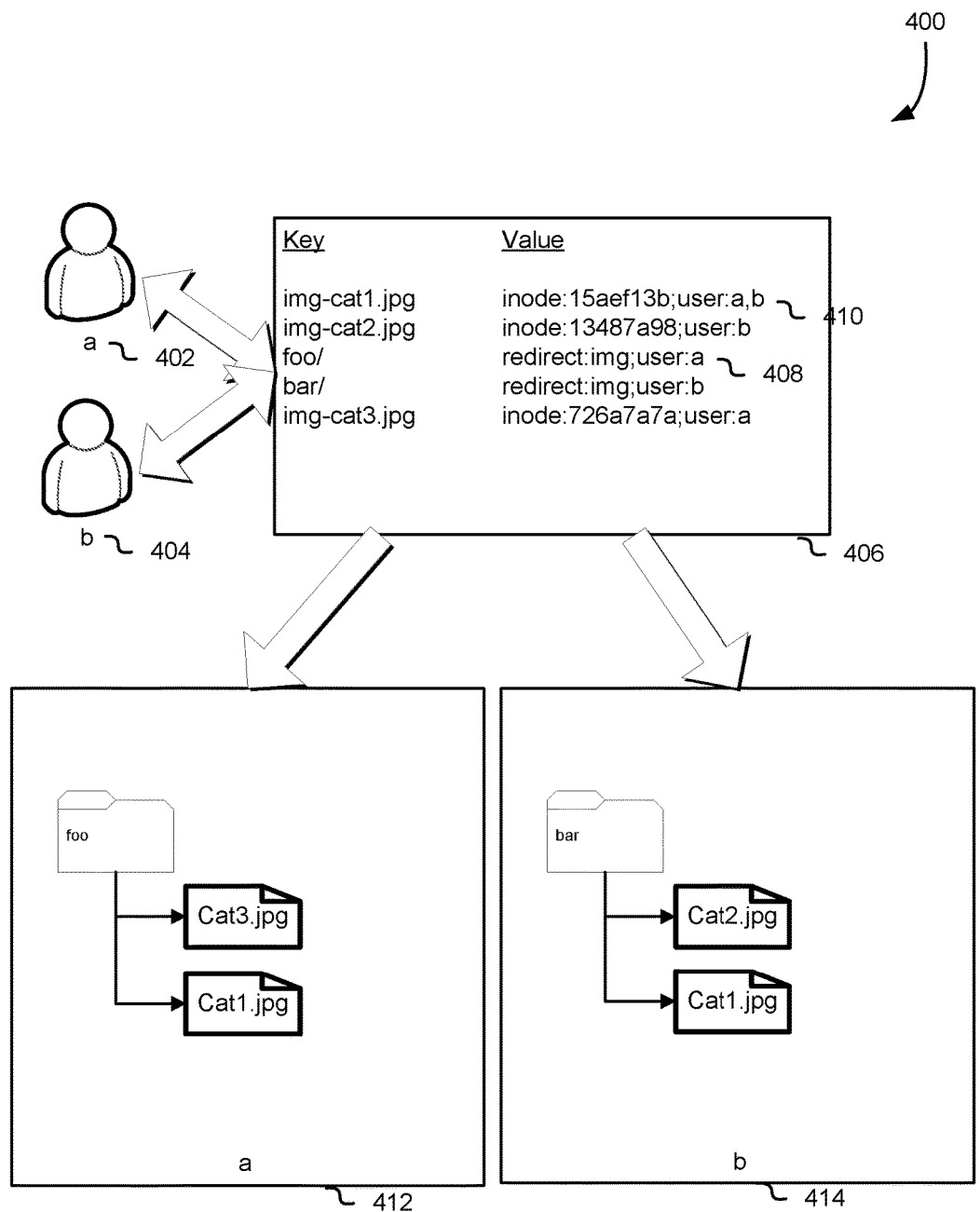
FIG. 4 illustrates an example representation of policy-controlled access and behavior of a key-value store implementing a flat keyspace and simulating a multi-level hierarchical structure, such as a directory tree, in accordance with some embodiments.

FIG. 4 illustrates an example representation of policy-controlled access and behavior of a key-value store implementing a flat keyspace and simulating a multi-level hierarchical structure, such as a directory tree, in accordance with some embodiments. As discussed in connection with FIG. 3, a key-value store includes several key-value pairs in a flat keyspace 406, some of the key-value pairs being object-associated 410 and some being redirecting 408. As mentioned in connection with FIG. 2, one or more policies, such as those that are managed, stored, and evaluated in connection with a policy management service, may be used to control access by multiple users 402, 404, or the behavior and/or appearance of a given userspace 412, 414 depending on the identity of such user(s) 402, 404.

As mentioned, the policy may be explicitly identified as part of a request, implicit based on the identity of the requestor (or that there are requestors in the first instance), and/or relevant policies may be associated with the individual objects, either as part of the value of such key-value pairs associated therewith (as illustrated) or in some other structure or entity (e.g., as controlled by an implemented policy management service).

In the illustrated example, user a 402, when interacting (directly or indirectly) with the key-value store, is able to access and manipulate a different (and in the illustrated example, overlapping) subset of the objects, as well as a differing redirect behavior, relative to the user b 404. For example, turning to the schematic of the userspace 412, user a is able to access simulated directory "foo/", which redirects to "img-." However, of the objects with the prefix "img-," only img-cat1.jpg and img-cat3.jpg are associated with user a (as part of the simplified policy illustrated and integrated within the value for the associated key-value pairs for those objects). Accordingly, user a sees "cat1.jpg" and "cat3.jpg" as children of simulated directory "foo/." Similarly, user b only sees simulated directory "bar/," which contains cat1.jpg and cat2.jpg. Operations by user a for cat2.jpg would simply fail, according to the policy set forth, as would operations by user b for cat3.jpg.

Other variations integrating policy-based management of access control are contemplated hereby. For example, a policy may define specific permissions for different objects, redirecting key-value pairs, users, and/or some combination thereof, so as to effect more granular control than the example illustrated in this FIG. 4.

Figure 5:
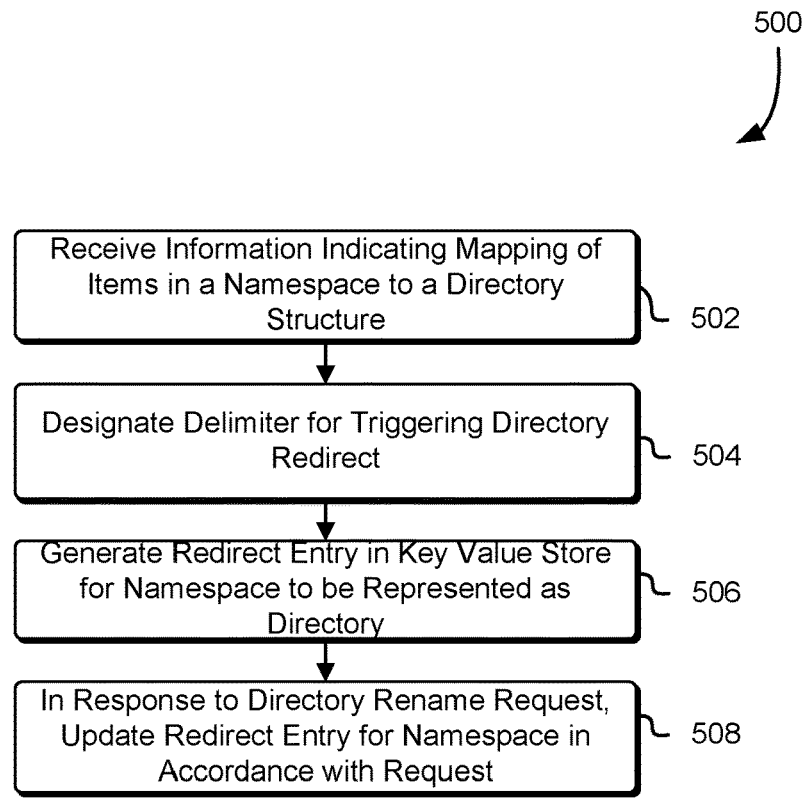
FIG. 5 illustrates an example process for adapting a flat keyspace to redirect directory-related requests, in accordance with some embodiments.

FIG. 5 illustrates an example process for adapting a flat keyspace to redirect directory-related requests, in accordance with some embodiments. At step 502, information is received, such as by a key-value store, a service front end, or some other entity associated with a computing resource service provider by which objects are stored or otherwise represented, indicating one or more mappings of items (e.g., objects) in a given namespace (as, e.g., denoted by a prefix), to a directory structure or other simulated hierarchical construct. Such mapping requests may be a separate request from an action or other request by which objects are committed to the computing resource service provider for storage, or may be implicit (or explicit as part of the same storage request) as described previously.

At step 504, a delimiter triggering the redirect associated with the items mapped in step 502 is defined, such as by the user, predetermined by the system, or some combination thereof (e.g., system provides a limited selection of delimiters from which the user may choose). As previously discussed, the delimiter is invoked by a requestor so as to alert the system as to one or more simulated directories to which the request pertains. At step 506, a redirect entry (redirecting key-value pair is added to the key-value store, such as by an implementing system, and is associated with one or more namespaces to be included within that construct (e.g., in accordance with FIGS. 1 and 3-4).

As previously discussed, since the object mapping and the name of the simulated directory is contained within one or a limited number of redirecting key-value pairs, at step 508, in response to a directory rename request, only the redirect entry (redirecting key-value pair) need be renamed, e.g., the key associated therewith, so as to rename the directory structure to with which the mapped objects/namespaces are associated.

Figure 6:
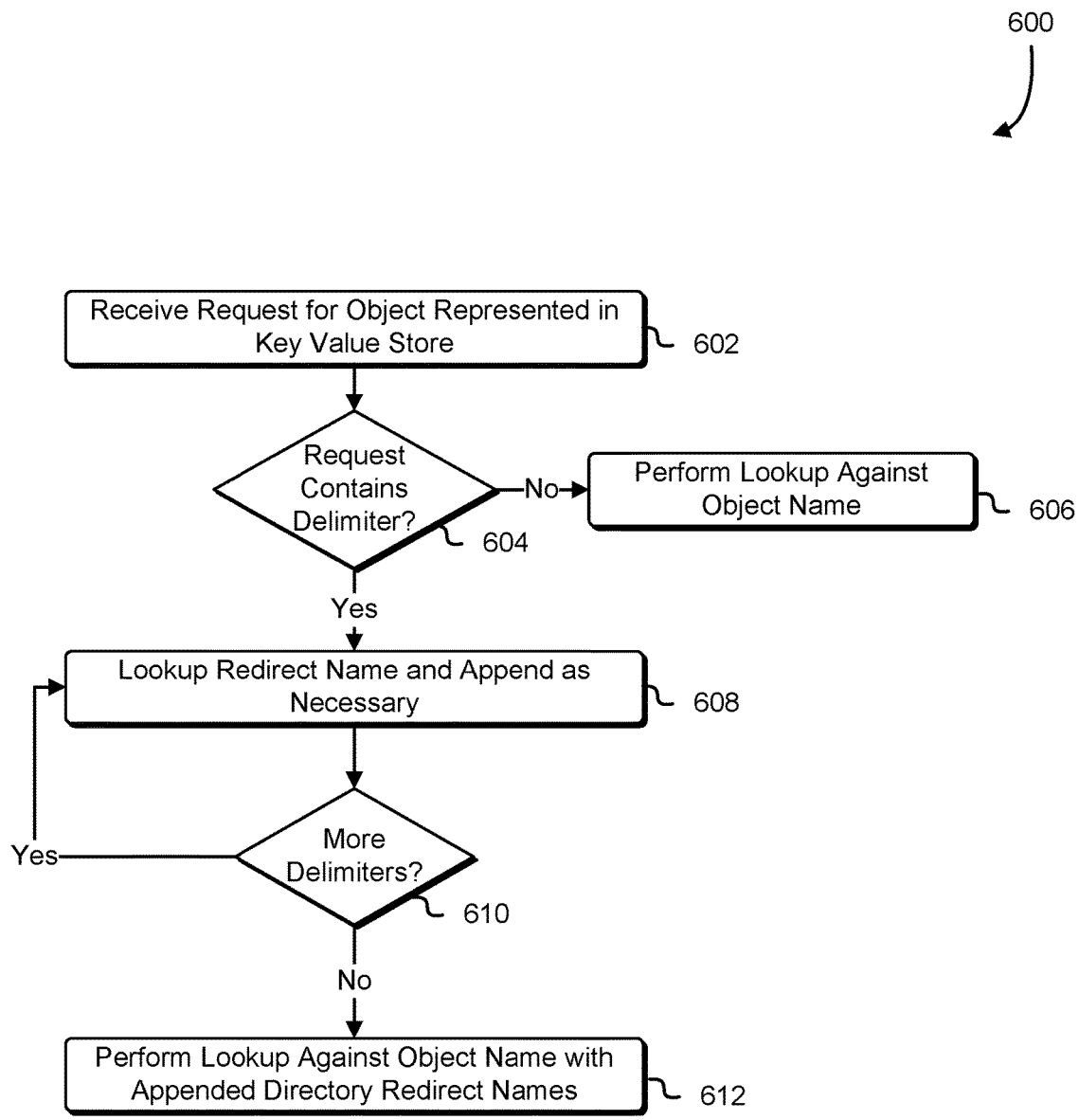
FIG. 6 illustrates an example workflow for retrieving objects associated with a simulated multi-level hierarchy from a key-value store with a flat keyspace, in accordance with some embodiments.

FIG. 6 illustrates an example workflow for retrieving objects associated with a simulated multi-level hierarchy from a key-value store with a flat keyspace, in accordance with some embodiments. At step 602, a request for an object represented in the key value store is received, such as by the key-value store, a service front end, or other entity associated with an implementing computing resource service provider. At decision point 604, if the request does not contain any delimiter (as previously discussed in connection with FIGS. 1-5), the entire object name as defined in the request is used to fulfill the request, and a lookup is accordingly performed against the key-value pairs in the flat keyspace.

However, if the request does contain a delimiter at decision point 604, the redirect name associated with the delimiter (e.g., preceding the delimiter, in normal directory syntax) is used so as to locate one or more matching redirecting key-value pairs within the flat keyspace at step 608. As may be contemplated, the directory structure may be more than one directory deep, and if there are further delimiters at decision point 610, additional (in some cases inherited) simulated directory structures are located within the keyspace.

To the extent that all of the simulated directories are located in the order presented by the request and properly exist within the keyspace, such simulated directory names are internally and sequentially (in the case of nested directories) appended to the request (e.g., to the object name to which the request pertains), and when the fully qualified object name is built, the operation (e.g., lookup) against the full "path" name is performed at step 612.

Figure 7:
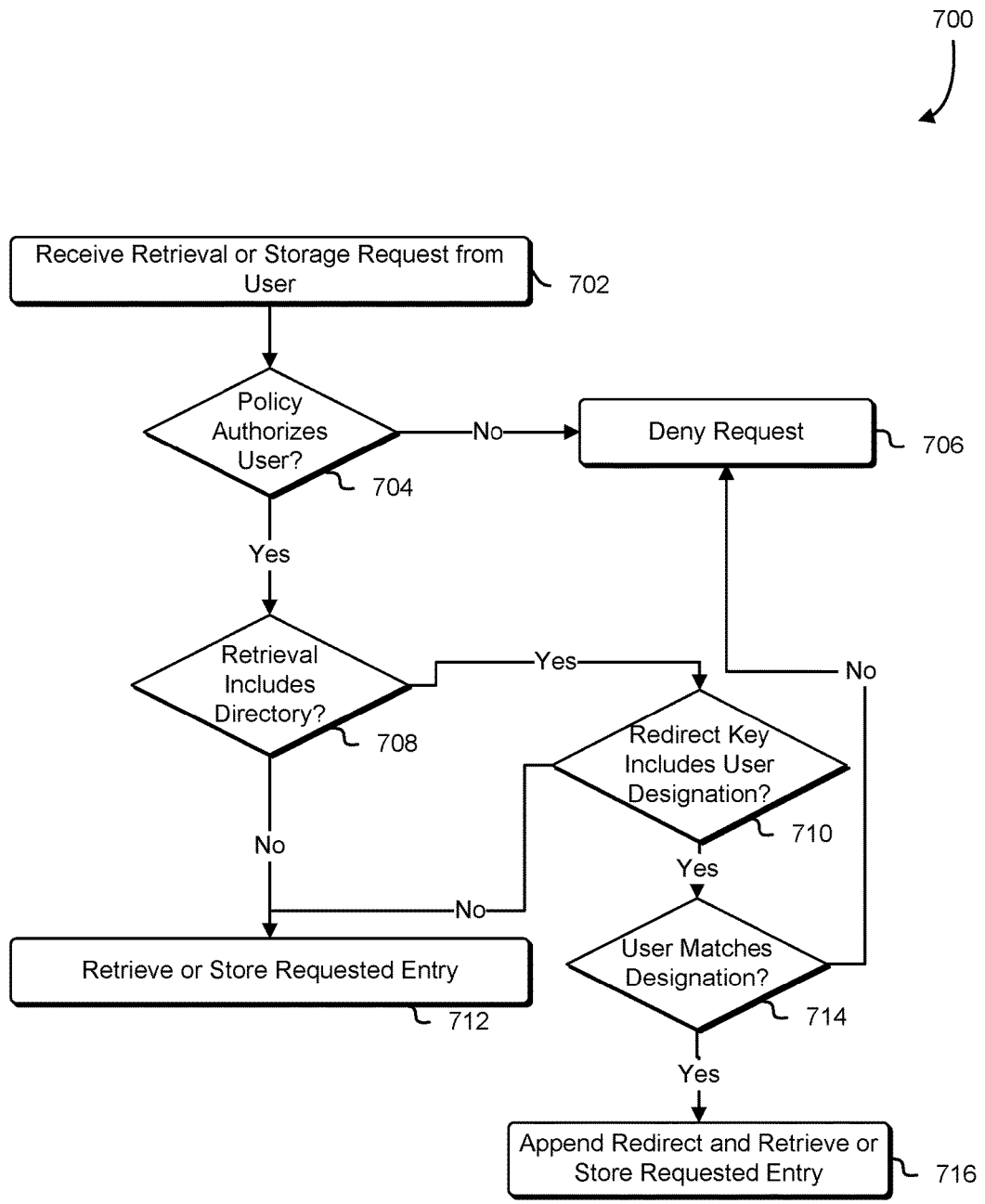
FIG. 7 illustrates an example workflow for authorizing users and actions associated with requests for objects stored using a simulated multi-level hierarchical structure, in accordance with some embodiments.

FIG. 7 illustrates an example workflow for authorizing users and actions associated with requests for objects stored using a simulated multi-level hierarchical structure, in accordance with some embodiments.

At step 702, a retrieval (GET), storage (PUT), deletion, list, or other request is received by an entity of the computing resource service provider, e.g., by a service front end, by a requestor, such as a user. As previously mentioned, such a request may be received via an API or webservice call, or may be perpetrated via a user interface provided by the computing resource service provider. At decision point 704, a relevant policy or set of policies is queried (e.g., as made available or controlled by a policy management service) to determine if the requestor, or user associated with the request (to the extent that the requestor and the user to be authorized differ). If the policy/policies does not authorize the user, the request is denied at step 706. However, if the policy/policies do authorize the user at decision point 704, a determination is made at decision point 708 as to whether the retrieval includes a simulated directory (e.g., by inclusion of one or more delimiting characters within the request). If the request does not include a simulated directory at decision point 708, the full request is serviced according to the policy (e.g., limitations, permissions, etc., as defined in the policy and/or provided by the policy management service).

If the request does denote a simulated directory at decision point 708, the redirecting key-value pair associated with the directory is assessed at decision point 710 to determine whether there are any policy-based restrictions, e.g., user permissions, associated with that redirection. If so, and the user matches the policy designation at decision point 714, the request is fulfilled as appended (e.g., according to the processes of FIGS. 5-6). Otherwise, the request is denied at step 706.

Figure 8:
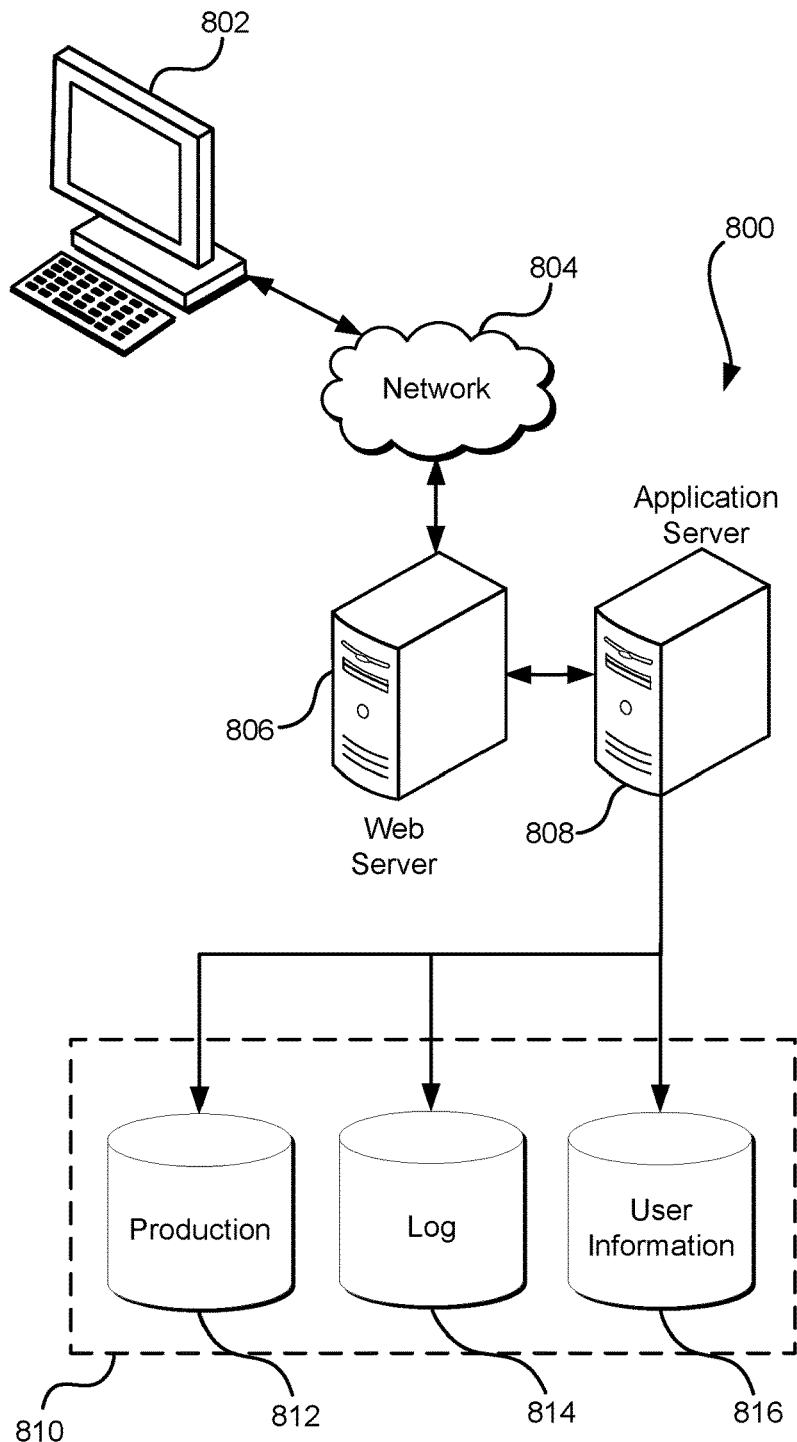
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
storing a plurality of key-value pairs in a key-value store, a first subset of the plurality of key-value pairs including a first key and a first value, the first key indicating an object name and the first value indicating a location where an object associated with the object name of the first key is stored, a second subset of the plurality of key-value pairs including a second key and a second value, the second key indicating a delimiter and a directory name associated with a namespace, the second value indicating the namespace; and
in response to a first data retrieval request including the directory name and the delimiter:
querying the key-value store to determine that the directory name matches at least a key-value pair of the second subset of the plurality of key-value pairs;
as a result of the directory name matching at least the second key of the second subset of the plurality of key-value pairs, using the second key to determine the namespace associated with the second value;
mapping the directory name to the determined namespace of one or more objects associated with the first data retrieval request; and
retrieving, using the first subset of the plurality of key-value pairs, the one or more objects having the determined namespace and associated with the first data retrieval request from the location indicated by the first value.

2. The computer-implemented method of claim 1, further comprising, in response to a rename request for the directory name associated with the namespace, updating the first key to reflect a new directory name.

3. The computer-implemented method of claim 1, wherein the location where the object is stored is associated with a data storage system separate from the one or more computer systems.

4. The computer-implemented method of claim 1, wherein the plurality of key-value pairs are associated with objects stored in a plurality of disparate data storage systems.

5. A system, comprising:
at least one computing device configured to implement one or more services that:
adapt a keyspace represented in a key-value store, the keyspace including a plurality of key-value pairs arranged in a flat hierarchy, to include a structure simulating a multi-level hierarchy within the keyspace, by at least:
storing a key-value pair in the key-value store, the key-value pair having a key that indicates a redirect name for the structure and a value that indicates a namespace associated with the structure; and
assigning a delimiter that, when invoked, activates a redirect for requests associated with the structure; and
in response to a request, associated with the namespace, that invokes the delimiter:
verify that a requested structure name defined in the request matches the redirect name for the structure;
as a result of the requested structure name matches the redirect name for the structure, append, to the request, the redirect name for the structure to the namespace, thereby generating an appended request; and
perform one or more actions associated with the request in accordance with the appended request.

6. The system of claim 5, wherein the request is a request to retrieve one or more objects stored in connection with one or more key-value pairs of the plurality of key-value pairs.

7. The system of claim 5, wherein the request is a request to store, delete, or list one or more objects in connection with one or more key-value pairs of the plurality of key-value pairs.

8. The system of claim 5, wherein the structure is a directory structure.

9. The system of claim 8, wherein the directory structure is defined by a requestor associated with the request.

10. The system of claim 5, wherein the one or more services are further configured to, in response to a rename request for a structure associated with the namespace, update the key with a new redirect name.

11. The system of claim 5, wherein at least some values stored in the key-value store point to locations of objects stored outside of the key-value store.

12. The system of claim 5, wherein the request is received through an application programming interface provided by the system.

13. A non-transitory computer-readable storage medium having stored thereon executable instructions that, as a result of being executed by one or more processors of a computer system, cause the computer system to at least:
simulate a multi-level hierarchy in a keyspace having a flat hierarchy and being represented in a key-value store, the keyspace including a plurality of key-value pairs, by at least:
generating a redirecting key-value pair for storage in the key-value store, the redirecting key-value pair having a key that indicates a redirect name and a value that indicates a namespace; and assigning a delimiter that, when invoked, activates a redirect for requests associated with the redirecting key-value pair; and in response to a request invoking the delimiter:

verify that a requested redirect name in the request matches the key of the redirecting key-value pair; and as a result of verifying that the requested redirect name in the request matches the key of the redirecting key-value pair, perform one or more in accordance with the request.

14. The non-transitory computer-readable storage medium of claim 13, wherein the instructions further comprise instructions that, as a result of being executed by the one or more processors, cause the computer system to assign the delimiter in response to receiving an external request defining the delimiter.

15. The non-transitory computer-readable storage medium of claim 13, wherein the instructions further comprise instructions that, as a result of being executed by the one or more processors, cause the computer system to assign the delimiter by predetermining the delimiter.

16. The non-transitory computer-readable storage medium of claim 13, wherein the instructions further comprise instructions that, as a result of being executed by the one or more processors, cause the computer system to append the requested redirect name to the request.

17. The non-transitory computer-readable storage medium of claim 13, wherein the multi-level hierarchy is a directory tree viewable by a requester associated with the request.

18. The non-transitory computer-readable storage medium of claim 13, wherein the request is a write request associated with an object to be stored via the computer system.

19. The non-transitory computer-readable storage medium of claim 13, wherein the request is a read request associated with an object to be stored via the computer system.

20. The non-transitory computer-readable storage medium of claim 13, wherein the namespace is associated with a data storage system on which a plurality of objects associated with the request is stored.

\* \* \* \* \*